May 12, 1942.    J. L. CREVELING    2,282,321
ELECTRIC SYSTEM
Filed Aug. 29, 1938
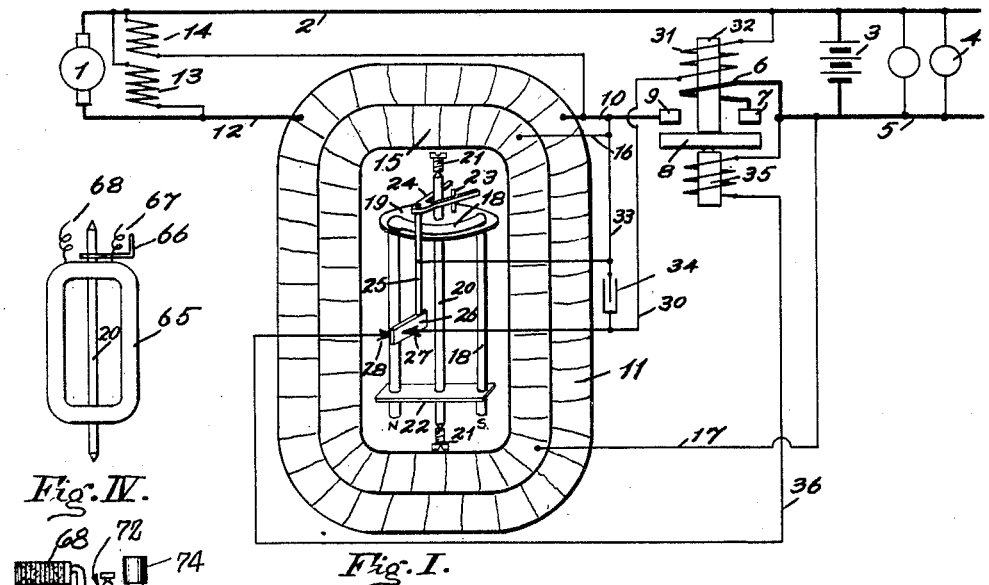
Fig. I.
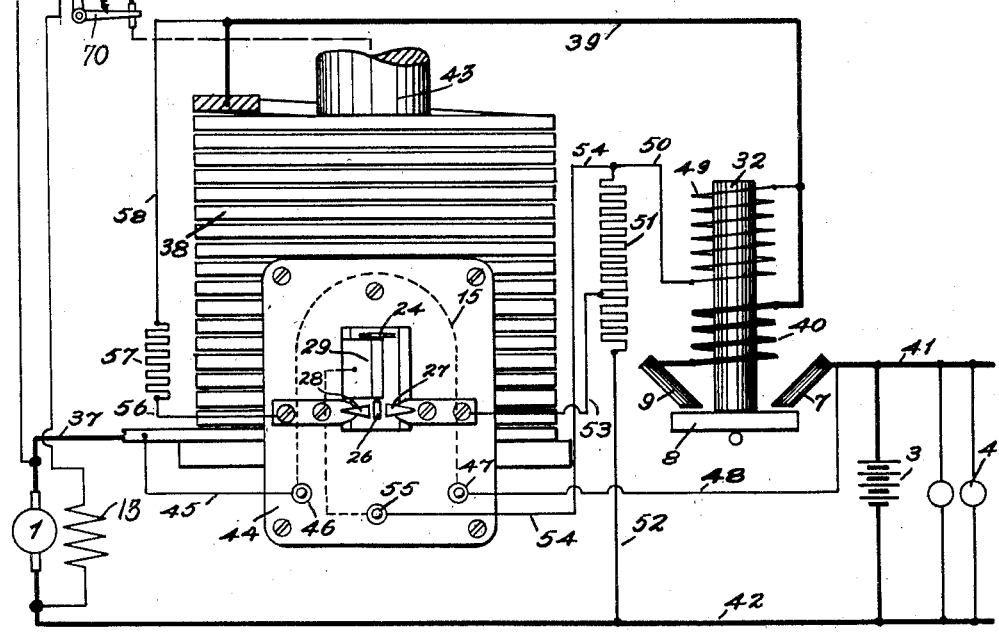
Fig. II.
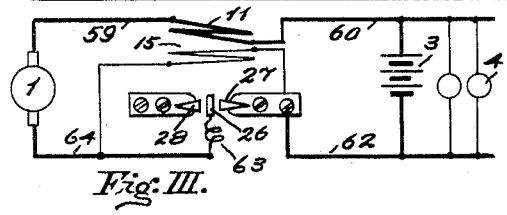
Fig. III.
INVENTOR:
John L. Creveling Patented May 12, 1942

2,282,321

UNITED STATES PATENT OFFICE 2,282,321

ELECTRIC SYSTEM

John L. Creveling, Tucson, Ariz., assignor to The Safety Car Heating and Lighting Company, Inc., a corporation of Delaware Application August 29, 1938, Serial No. 227,317

5 Claims. (Cl. 171—314)

My invention relates to that class of electric systems wherein a dynamo or generator is used to charge a storage battery and operate lamps or other translating devices which are supplied by the battery when the dynamo is inoperative. As such systems are particularly applicable for the lighting of railway cars where the dynamo is driven at variable speed and subjected to stopping and starting, my invention will be described with particular reference to such a car lighting system.

It is an object of my invention, in such a system, to cause the generator and storage battery to be automatically connected when their voltages are substantially equal; and it is a further object of my invention to so connect the generator and battery when their voltages are so nearly equal that they may be considered, in practice, as equal, and to cause this connection to be broken when the generator voltage falls so slightly below that of the battery that the back discharge through the generator is substantially negligible. A further object of my invention is to bring about such connection and disconnection of the generator and battery throughout wide variation in the battery voltage, as the voltage across the battery in such systems often varies considerably depending upon the condition of the storage battery and upon its condition of charge at the particular moment of such connection. In practical operating systems, it is not unusual for the voltage across the battery to vary between 28 and 40 volts, or thereabouts; and, in the system of my present invention, I cause the connection and disconnection of the generator to take place at what may be considered, for all practical purposes, substantially equal generator and battery voltages, even throughout a much wider range than this.

It is a further object of my invention to use a very slight current drawn from the battery and of so low value as not to form any appreciable drain thereupon, for the purpose of causing the generator to "build up" properly when started, and to utilize this current for the purpose of functioning in the operation of connecting and disconnecting the generator and battery.

Another object of my invention is to provide inexpensive and effective means whereby existing systems now in common use may be readily altered to include my invention.

Another object of my invention is to provide means for utilizing parts of systems now in use to perform additional functions in carrying out my invention.

Other objects will be obvious in view of the following specification and claims:

In the drawing,

Fig. I is a diagrammatic representation of one type of system embodying my invention.

Fig. II is a diagrammatic representation of parts of systems now in common use, to which my invention has been applied, and shows a portion of one form of my invention in elevation.

Fig. III is a diagram indicating how my invention may be incorporated in a system of relatively small output.

Fig. IV indicates a modification that may be made in a portion of my invention.

In the drawing, referring particularly to Fig. I, 1 represents a dynamo or generator having one of its brushes connected as by wire 2 with one side of the storage battery 3 and lamps or other translating devices indicated at 4. The other side of the battery 3 and translating devices 4 is connected with the wire 5 which leads to one side of the coil 6 having its other terminal connected with the contact member 7. 8 is a bridging member adapted to form electrical connection between the contact member 7 and the similar member 9 when raised. Member 9 is connected as by wire 10 with one terminal of the coil 11, composed of heavy wire or strip, and having its other terminal connected with the remaining brush of the generator as by wire 12. The generator is shown with an ordinary shunt coil 13 and also an auxiliary shunt coil 14 across the wires 2 and 10, so that its current flows through the coil 11 for a purpose to be later explained. Within the coil 11, or in close proximity thereto, is placed the coil of relatively very fine wire 15 which preferably has, at least, approximately, the same center as the coil 11. One end of coil 15 is connected as by wire 16 with the wire 10, while the opposite end is connected with the wire 5 as by wire 17. Thus, it will be noted that the coil 11 is in series with the switch arrangement 7—8—9, and that coil 15 is connected around or in shunt to the switch 7—8—9.

18 indicates a small horse-shoe magnet, carried by a light aluminum disc 19, supported by pivot member 20 which is free to revolve with very little friction in its supporting cup-screws 21 which, in turn, are supported by suitable means, not shown. The $n$ and $s$ poles of the magnet 18 are held in proper relation to the member 20 by the light aluminum spacer 22. The disc 19 is provided with a pin 23, adapted to engage the arms of the forked member 24 so as to cause the member 24 to rotate the shaft 25 carrying the contact member 26, and thus rotate member 26 into contact with either the contact member 27 or 28, as may be determined by the direction in which the magnet 18 is revolved. The assembly 24—25—26 is supported in any suitable manner (not shown in Fig. I) as by the bracket 29 in Fig. II. Contact member 27 is connected as by wire 30 with one terminal of the coil 31 having its opposite terminal connected with the wire 2. Coil 31 surrounds the core 32, connected with the member 8, and when energized tends to lift the member 8 into contact with members 7 and 9. The contact member 26 is in electrical communication with the wire 10 as by wire 33, while 34 is a condenser which may be placed across wires 30 and 33, as will later be explained. 35 is an electro-magnet which when energized tends to hold the member 8 in the position shown in the drawing, and has one of its ends in communication with the wire 5 and the other connected with the contact 28 as by wire 36.

In Fig. II, like numerals indicate like parts, and the generator 1 is shown as connected by wire 37 with one end of the current regulating coil or solenoid 38, now found in nearly all car lighting systems and usually made of edgewound strips, as indicated. Only a portion of the usual coil, sufficient for present purposes, is here shown in substantially full size as employed in the most common type of system, which is made in accordance with my Patent No. 1,251,479 of Jan. 1, 1918, wherein the function of this coil is explained. Accordingly a shunt field coil 13 is provided having in series therewith a variable regulating resistance in the form of a carbon pile 68. A bell crank lever 70 has one arm normally drawn in an upward direction by an adjustable spring 72 in such a manner as to tend to compress the carbon pile 68 and reduce the resistance thereof. A dash pot 74 resists sudden movement of the bell crank, and the bell crank is pulled downwardly by a core or plunger 43 which extends through coil 38. As indicated above, one end of coil 38 is connected to wire 37 and the opposite end of this coil is connected by wire 39 with one end of the coil 40, having its opposite end connected with the brush 9 of a well-known type of main switch now to be found in use in many car lighting systems. This switch includes a bridging member 8 and a brush 7, connected as by wire 41 with one side of the storage battery 3 and lamps or other translating devices 4, which have their opposite terminals connected as by wire 42 with the remaining brush of the dynamo 1.

Close to the coil 38, and usually near one end thereof, is positioned a relay which may have the movable system, indicated by the numerals 18 to 26 in Fig. I, surrounded by a coil of fine wire, as shown at 15 in Fig. I, and indicated in Fig. II by a mere loop in dotted lines, for ease in illustration. This relay, which is here shown in substantially full size in a form I have found very readily applicable to some of the systems now in use, is provided with a face plate 44 of insulating material in which there is a small window exposing the parts 24, 26 and 29 to view.

The contact member 26 extends through the window and may contact with either the member 27 or member 28, carried by plate 44, when the magnet 18 (shown in Fig. I) is revolved in proper direction. The wire 37 is electrically connected as by wire 45 with the binding post 46, which is connected with one end of coil 15 which has its opposite end connected with the post 47, as indicated by the dotted loop. Post 47 is connected as by wire 48 with the wire 41. 49 is a coil of relatively fine wire surrounding the core 32 which it tends to raise when energized, so as to cause the member 8 to connect the brushes 7 and 9. One end of coil 49 is connected with wire 39 and the other end is connected, as by wire 50, with one terminal of the resistor 51, which has its opposite terminal connected by wire 52 with the wire 42. The resistor 51 is provided with an intermediate tap connected as by wire 53 with the contact member 27. The upper end of resistor 51 is connected as by wire 54 with the post 55, which is in electrical communication with the contact member 26, as indicated by the dotted line. Contact member 28 is connected as by wire 56 with one end of the resistor 57, having its opposite end connected with the wire 39, as by wire 58.

In Fig. III, the dynamo 1 is connected with one end of the coil 11, which has its opposite end connected as by wire 60 with one side of the battery 3 and translating devices 4. The coil 11 is indicated merely, and is preferably of the type shown in Fig. I. The remaining terminals of the battery 3 and devices 4 are connected with the wire 62, which is in communication with the contact member 27. The movable contact 26 communicates with the wire 64 by means of the pig tail indicated at 63, and 64 is connected with the remaining brush of the generator. The coil indicated at 15 is similar to coil 15 of Fig. I, and across the contacts 26—27, as indicated.

In Fig. IV, there is shown a small, relatively flat, coil, indicated in elevation at 65, which is carried by a pivot shaft 20, corresponding to 20 in Fig. I. The shaft 20 carries an arm having an upwardly extending end 66 corresponding to the pin 23 of Fig. I. Coil 65 may be connected to any suitable source of current, as across the battery 3 in Figs. I, II and III, by means of the flexible leads 67 and 68. Such a coil may be obviously substituted for the magnet 18 shown in Fig. I, but, of course, the plane of the coil would have to be at right angles to the plane of the magnet, and the member 66 is shown as having that position with respect to the pin 23 of Fig. I.

An operation of my invention is substantially as follows: Referring particularly to Fig. I, if the generator 1 be at rest or operating at sufficiently low speed, the switch will be open at 7—8—9 and the translating devices 4 may be supplied by the battery 3. Assuming that the positive brush of the generator is the upper one, a very feeble current will flow from the battery through wire 2, generator 1, wire 12, coil 11, wire 10, wire 16, and coil 15, from which return will be made through wire 17 and wire 5 to the battery. This current will tend to cause the generator field to build up upon starting, in a well-known manner, and will cause the magnet 18 to rotate upon its axis 20 and the pin 23 to move the fork 24 until arrested by the contact of member 26 with either the member 27 or 28, depending upon the direction of the winding of coil 15.

I so connect the coil 15 that this current will cause the member 26 to be held firmly in contact with the member 28 while this condition prevails, and, therefore, current will flow from the battery to wire 10, as above pointed out, and thence through wire 33, member 25, contact member 26, contact 28, wire 36, and magnet 35, to wire 5 and battery 3. This current will cause magnet 35 to hold the switch open at 7—8—9 against any accidental closing.

Now, if the generator have its speed increased, its voltage will oppose that of the battery and lessen the current flowing in the coil 15, which is really across the break of the switch 7—8 and 9. When the generator voltage becomes equal to that of the battery, there will be no current in the coil 15; and, if the generator voltage exceed that of the battery, the current in coil 15 will reverse and tend to cause the magnet 18 to so rotate as to assume its other extreme position, breaking the contact at 26—28 and establishing contact between 26 and 27, whereupon the circuit of magnet 35 will be opened and prevent the magnet 35 from interfering with movement of the member 8. Closing the contact at 26—27 will cause current to flow from wire 2 through coil 31, wire 30, contact 27—26, member 25, wire 33, and wire 10 to coil 11, from which return to the generator is made by wire 12. This current in coil 31 will cause it to raise its core 32 and connect the generator with the battery through contact 7—8—9, so that the generator may now charge the battery.

I so connect the coil 11 that this current will tend to revolve the magnet 18 in such direction as to firmly hold the contact 26—27 closed, so long as the above conditions prevail. The coil 6, which may or may not be employed, as desired, is so wound that this charging current assists the coil 31 in holding a good pressure contact at 7—8—9. As the magnet 18 is made as light as practicable, and in ordinary service needs only to have very small mass, it requires very little effort to cause it to rotate upon its pivotal support which, if properly constructed, will have very little friction. And, as the magnet 18 is free to move away from one extreme position toward the other for a reasonable distance before encountering any work, it will gather some momentum before the pin 23 engages the opposite branch of the fork 24, and thus readily overcome the inertia of parts 24, 25, 26, which also have very little mass. Therefore, it will require very little excess in generator voltage over that of the battery to cause the relay to close the contacts of the switch 7—8—9, and, in practice, I find it can readily be done with less than one-half volt difference. However, if it be desired to lessen this difference, some small load may be placed upon the generator, in such manner as to cause some current to flow through coil 11, even while the generator voltage is below that of the battery, which current will tend to oppose the effect of current in coil 15 under these conditions until the effect of coil 15 is so weak as to be overcome by the current in coil 11, which may then cause the magnet 18 to revolve and close switch 7—8—9 or assist coil 15 upon its reversal in so doing. For this purpose, I have indicated the generator field as provided with two coils, one of which, 13, is across the generator, as usual, while the other, 14, is connected across wires 2 and 10, in such manner that its current flows through coil 11. With this arrangement, if the resistance of 14 be properly chosen with respect to coils 11 and 15, the switch may be caused to close a little above, below, or at the battery voltage, throughout considerable range; while, if the closing of the switch depends entirely upon coil 15, as previously disclosed, the closing takes place at a fixed excess of generator voltage above that of the battery, regardless of the value of the latter throughout any range of battery voltage from zero to that limited by heating of coil 15 when the generator is cut out and full battery voltage is upon the coil.

If, now, the voltage of the generator fall slightly below that of the battery, the battery will discharge through wire 2, generator 1, wire 12, and coil 11, and a very slight current in coil 11 in this direction will cause it to rotate the magnet 18 to open the contact 26—27 and, by interrupting the current in coil 31, cause the switch to open at 7—8—9, provided, of course, that coil 6, if employed, be of such dimensions that the current in coil 11 necessary to rotate magnet 18 is less than that necessary in coil 6 to hold the switch closed, a condition readily met in practice, if desired to employ the coil 6 to assist in holding the switch closed when carrying heavy charging current. The condenser 34 may be connected around the break at 26—27, as shown, to reduce sparking when the contact is opened, if desired.

It is, of course, obvious that coil 6 may be omitted and that instead of the generator, any suitable source of electromotive force, such as the battery 3, may be employed to supply the current in coil 31 or coil 35 if properly connected through the relay contacts 26—27—28. However, I prefer the connections shown, since the switch may be closed by generator current in coil 31, even if the battery become disconnected and there is a load upon the translating circuit. And, further, the break at 26—28 will always take place at such times as there will be practically no potential difference across the contacts.

The operation of the system of Fig. II is very similar to that just described with respect to Fig. I, except that the coil 11 is omitted and the current coil of the generator regulator, common to nearly all car lighting systems now in use, is utilized in its stead, and a common type of main switch to be found in use is adapted to be operated by the relay.

Assuming the upper brush of the generator to be the positive and the battery 3 connected accordingly, if the generator be at rest or operating at very low speed a very feeble current will flow from the battery 3 through wire 41, wire 42, post 47, and coil 15 to post 46, and thence through wire 45, wire 37, generator 1, and wire 42. This will cause the rotating magnet mechanism, described with respect to Fig. I, to so revolve as to establish contact between 26 and 28, and this contact will be held closed as long as any appreciable current is flowing in the coil 15. If the generator voltage be increased to nearly that of the battery, the current in coil 15 will become very feeble as the generator and battery voltages are opposed, but a relatively strong current will flow from the generator through coil 38, wire 39, coil 49, wire 50, resistor 51, wire 52, and wire 42 to the generator. This current in coil 49 will tend to lift core 32 and connect the generator with the battery at 7—8—9; but, I so choose the value of resistor 51, which is usually found connected with these switches in practice for the purpose of temperature compensation of coil 49, that this coil 49 would not be apt to close the switch under any condition in service, so long as it received all of its current through the entire resistor 51. And, further, I make sure that the switch will not be closed until the generator voltage reaches that of the battery by means of the circuit containing the resistor 57 which is in shunt to coil 49, as long as the contact is closed at 26—28, since 28 is connected, as by wire 56, resistor 57 and wire 58 with wire 39, and 26 is connected by wire 54 with the upper end of resistor 51. This will obviously weaken the current in coil 49, as this coil and the resistor 57 both receive the current through resistor 51. If, now, the generator voltage be increased until very slightly above that of the battery, current will flow through coil 15 to the battery and cause the contact 26—28 to be broken and the contact 26—27 to be made, as described with respect to Fig. I. This will break the shunt around coil 49 and shunt out that portion of resistor 51 below the tap, connected as by wire 53 with the contact 27, and thus so increase the strength of coil 49 that it will close the contacts at 7—8—9 and allow the generator to charge the battery. This charging current will flow from the generator through wire 37, coil 38, wire 39, coil 40, contacts 9—8—7, and wire 41, to battery 3, and return to the generator through wire 42. The current in coil 40 while flowing to the battery assists coil 49 in holding a good pressure contact at 7—8—9, while the current in coil 38 serves to operate the current regulating mechanism found in these systems in the usual manner.

Now, while charging current is flowing in coil 38 tending to pull the usual plunger 43 downwardly through a limited range, which in practice is only a fraction of the length of the coil, most of the magnetic lines within the coil will follow a vertical direction within the iron core and the magnetic return circuit through the air, particularly at the ends of the coil, will have a considerable portion of its flux in a substantially horizontal general direction. These lines, or what is often considered as "stray field," will take the place of the field of coil 11 in Fig. I, and, therefore, this coil can be dispensed with, provided coil 38 be wound in the proper direction. This coil is so connected that after the contact is made between 26 and 27, the current in coil 38 causes the contact to be held closed so long as the generator continues to supply current to the battery or translating devices.

Now, if the generator voltage fall very slightly below that of the battery, a slight back discharge through coil 40 will tend to weaken the effect of coil 49; and, by flowing through coil 38, reverse the direction of its "stray field" and cause the contact at 26—27 to be broken, and the contact at 26—28 to be established, and the back discharge then flowing through the coil 15 will hold this contact closed as long as the generator voltage remains below that of the battery, as previously explained.

The operation of the structure of Fig. III is believed to be obvious in view of the detailed operation of Fig. I, given above, it being only necessary to note that for relatively small values of output the contact at 26—27 may control the main circuit of the generator.

The operation of the modification indicated in Fig. IV is believed to be plain without any further description than previously given, as it is obvious that a proper coil, as shown at 65, may be used instead of the permanent magnet 18 of Fig. I, if the coil be constantly energized in a constant direction, as when connected across the battery.

From the above it will be noted that I have produced a system wherein the relay or device serving as the "brain" of the structure may be small, inexpensive, and delicate in operation, while the contactor or "brawn" of the mechanism may be made to carry any desired value of current without having undue dimensions or high cost. Further, it will be seen that my invention makes possible the conversion of systems now in use, wherein the generator and battery are connected when the generator voltage reaches a fixed value, into systems wherein the generator and battery are connected and disconnected when their voltages are substantially equal, regardless of the battery voltage, at small cost, and without alteration in the existing mechanism further than change in the resistor, here indicated at 51, which in practice is usually held in clips from which it is readily removable.

I do not wish in any way to limit myself to any of the details of construction or modes of operation herein given to illustrate an embodiment of my invention, for it will be obvious that wide departure in the way of details, both in construction and operation may be made without departing from the spirit and scope of my invention, which is as set forth in the following claims.

I claim:

1. In an electrical system, including a generator, a battery charged thereby, and an electromagnetically operated switch for connecting the generator and battery, means for controlling the operation of the switch comprising, the combination of, a first pivot means, a non-magnetic disc mounted upon said first pivot means, a permanent magnet carried by said non-magnetic disc, a second pivot means mounted parallel to said first pivot means and spaced therefrom a distance slightly in excess of the radius of said disc, a V-shaped member mounted with its apex rigidly attached to said second pivot means and with its two arms extending along one surface of said disc and upon opposite sides of said first pivot means, a switching arm rigidly mounted upon said second pivot means, and a pin extending from said disc between the arms of said V-shaped member and adapted to form a lost-motion connection between said first pivot means and said second pivot means so that upon extended movement of said disc in one direction said pin will engage one of the arms of said V-shaped member and thereby swing said second pivot means and said switching arm.

2. In an electrical system of distribution of the class wherein a generator charges a storage battery and the connection with the storage battery is made by the closing of a main switch and when the power output of said generator becomes excessive a generator control coil becomes effective to reduce the current through the generator field winding, the combination with said generator control coil of a control unit to control the opening and closing of said main switch, said control unit comprising a potential coil connected in parallel with said main switch and a movable means maintaining a permanent magnetic field pivotally mounted within the magnetic field set up by said generator control coil and said potential coil, said control unit having a switching element which is operated by the swinging of said movable means.

3. In an electrical system of distribution of the class wherein a generator charges a storage battery and the connection with the storage battery is made by the closing of a main switch and when the power output of said generator becomes excessive a generator control coil becomes effective to reduce the current through the generator field winding, the combination with said generator control coil of a control unit to control the opening and closing of said main switch, said control unit comprising a potential coil connected in parallel with said main switch and a movable means maintaining a permanent magnetic field pivotally mounted within the magnetic field set up by said generator control coil and said potential coil, said control unit having a switching element which is operated by the swinging of said movable means, said movable means comprising a permanent magnet pivotally mounted and said switching element being mounted to swing about an axis parallel to the pivotal axis of said permanent magnet and having a lost-motion mechanical connection with said permanent magnet.

4. In an electrical system, including a generator, a battery charged thereby and an electromagnetically operated switch for connecting the generator and battery, means for controlling the operation of the system comprising, a main switch, a hold-out coil to hold said main switch open, a closing coil to close said main switch, means forming a magnetic field which varies in intensity and in direction with the differential in voltage and flow of current between the generator and the battery, and a switching unit mounted within the magnetic field and having a pair of parallel spaced pivot means, magnetic means maintaining a permanent magnetic field pivotally mounted upon one of said pivot means, a control unit mounted upon the other of said pivot means and having a lost motion mechanical connection with said magnetic means, and circuit means controlled by said control unit to complete a circuit connecting said hold-out coil across said main switch in series with the generator and the battery when the battery voltage is above the generator voltage, and said circuit means completing a circuit connecting said closing coil across the generator when the generator voltage is substantially above the battery voltage.

5. In an electrical system of distribution on a railway car of the class wherein an axle-driven generator charges a storage battery and the connection with the storage battery is made by the closing of a main switch and when the current output of said generator becomes excessive a generator control coil carrying the generator current becomes effective to reduce the current through the generator field winding, the combination with said generator control coil of a control unit to control the opening and closing of said main switch, said control unit being mounted substantially within the magnetic field of said generator control coil and comprising a potential coil connected in parallel with said main switch and movable means maintaining a permanent magnetic field pivotally mounted to be acted upon by the magnetic field set up by said generator control coil and said potential coil, said control unit having a switching element which is mechanically related to be operated by the swinging of said movable means.

JOHN L. CREVELING.